United States Patent
Dholakia et al.

(10) Patent No.: US 7,823,011 B2
(45) Date of Patent: Oct. 26, 2010

(54) INTRA-DISK CODING SCHEME FOR DATA-STORAGE SYSTEMS

(75) Inventors: Ajay Dholakia, Cary, NC (US); Ilias Iliadis, Rueschlikon (CH); Robert Haas, Adliswil (CH); Xiaoyu-Yu Hu, Winterthur (CH); Evangelos S. Eleftheriou, Rueschlikon (CH); Roman A. Pletka, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 11/843,323

(22) Filed: Aug. 22, 2007

(65) Prior Publication Data

US 2009/0055681 A1 Feb. 26, 2009

(51) Int. Cl.
*G06F 11/00* (2006.01)
(52) U.S. Cl. .............................. 714/8; 714/6
(58) Field of Classification Search ............... 714/8, 714/6, 42
See application file for complete search history.

(56) References Cited

U.S. PATENT DOCUMENTS

| | | | | |
|---|---|---|---|---|
| 6,304,986 B1 * | 10/2001 | Ma et al. | | 714/718 |
| 6,412,089 B1 * | 6/2002 | Lenny et al. | | 714/769 |
| 7,447,938 B1 * | 11/2008 | Coatney | | 714/7 |
| 7,487,388 B2 * | 2/2009 | Kim et al. | | 714/8 |
| 7,490,261 B2 * | 2/2009 | Gaertner et al. | | 714/8 |
| 7,661,020 B1 * | 2/2010 | Coatney | | 714/7 |
| 2005/0022065 A1 * | 1/2005 | Dixon et al. | | 714/42 |
| 2005/0108594 A1 | 5/2005 | Menon et al. | | |
| 2005/0188238 A1 * | 8/2005 | Gaertner et al. | | 714/2 |
| 2009/0307523 A1 * | 12/2009 | Allison et al. | | 714/6 |

OTHER PUBLICATIONS

Disk Scrubbing in Large Archival Storage System, Schwartz et al., Proceedings of the 12th IEEE/ACM International Symposium on Modeling, Analysis, and Simulation of Computer and Telecommunication Systems, Volendam, Netherlands, Oct. 2004.
RAID: High-Performance, Reliable Secondary Storage, Chen et al., submitted to ACM Computing Surveys, Oct. 29, 1993.

* cited by examiner

*Primary Examiner*—Marc Duncan
(74) *Attorney, Agent, or Firm*—Cantor Colburn LLP; Stephen Kaufman

(57) ABSTRACT

Exemplary embodiments of the present invention comprise a method for the use of an intra-disk redundancy storage protection operation for the scrubbing of a disk. The method comprises initiating a disk scrubbing operation upon each disk of a plurality of disks that are comprised within a storage disk array, issuing a disk scrubbing command for a predetermined segment of the disks that are comprised within the storage disk array at a predetermined time interval, and identifying an unrecoverable segment on a disk. The method further comprises determining if unrecoverable sectors comprised within the unrecoverable segment can be reconstructed, and reconstructing the unrecoverable sectors of the unrecoverable segment and relocating the segment to a spare storage location on the disk in the event that the segment cannot be reconstructed within its original storage location.

4 Claims, 2 Drawing Sheets

INTRA-DISK CODING SCHEME FOR DATA-STORAGE SYSTEMS

CROSS-REFERENCE TO RELATED APPLICATIONS

This application contains subject matter which is related to the subject matter of the co-pending application entitled "Method to Protect Data oil a Disk Drive from Uncorrectable Media Errors" Ser. No. 10/716,136, filed Nov. 18, 2003, which is assigned to the same assignee as this application. International Business Machines Corporation of Armonk, N.Y. The above-mentioned application is hereby incorporated herein by reference in its entirety.

BACKGROUND OF THE INVENTION

1. Field of the Invention

This invention relates to storage system data maintenance, and particularly to the protection of storage systems against uncorrectable media errors.

2. Description of Background

Large-scale archival storage systems lose data for a variety of reasons. As such, failures can occur at both a device level and at a storage block level. The resolution and correction of a failure must be detected early enough to be able to utilize any redundancy that may be built into a storage system. For example, within current redundant array of independent disk (RAID) systems the redundancy available across disks is utilized to reconstruct erroneous sectors or block of sectors within a data storage system. In particular, a fault-detection process known as "disk scrubbing" is implemented within RAID systems in which disk drives are periodically accessed in order to detect any storage block failures. By scrubbing all of the data stored on all of the disks, a storage block failure can be detected and compensated for by the rebuilding of any affected sectors or block of sectors. Typically, such disk scrubbing operations are performed only during idle periods because the process requires additional disk I/O requests to be issued when an erroneous sector or block of sectors is found on a disk. This aspect leads to an increase in the performance time that is required to for a scrubbing cycle to be accomplished upon a RAID.

SUMMARY OF THE INVENTION

The shortcomings of the prior art are overcome mad additional advantages are provided through the provision of a method for the use of an intra-disk redundancy storage protection operation for the scrubbing of a disk. The method comprises initiating a disk scrubbing operation upon each disk of a plurality of disks that are comprised within a storage disk array, issuing a disk scrubbing command for a predetermined segment of the disks that are comprised within the storage disk array at a predetermined time interval, and identifying unrecoverable segments on a disk.

The method further comprises determining if unrecoverable sectors comprised within the unrecoverable segment can be reconstructed by the use of an intra-disk sector protection redundancy operation and reconstructing the unrecoverable sectors of the unrecoverable segment by the use of an intra-disk sector protection redundancy operation, where in the event that an unrecoverable sector cannot be reconstructed at an original storage location on a disk then the unrecoverable sector is reconstructed at a spare storage location on the disk. The method yet further comprises notifying a RAID controller of the location of the unrecoverable segment on the disk in the event that it is determined that the unrecoverable sectors comprised within the unrecoverable segment cannot be reconstructed by the use of an intra-disk redundancy sector protection operation and determining if the entire disk has been scrubbed.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

U.S. Patent Publication No.: 20050108594, entitled "Method to Protect Data on a Disk Drive from Uncorrectable Media Error," filed Nov. 18, 2003, describes a solution that provides protection against uncorrectable media errors by writing data and redundancy information on the same disk drive by the use of a sector protection through intra-disk redundancy (SPIDRE) operation.

Figure 1:
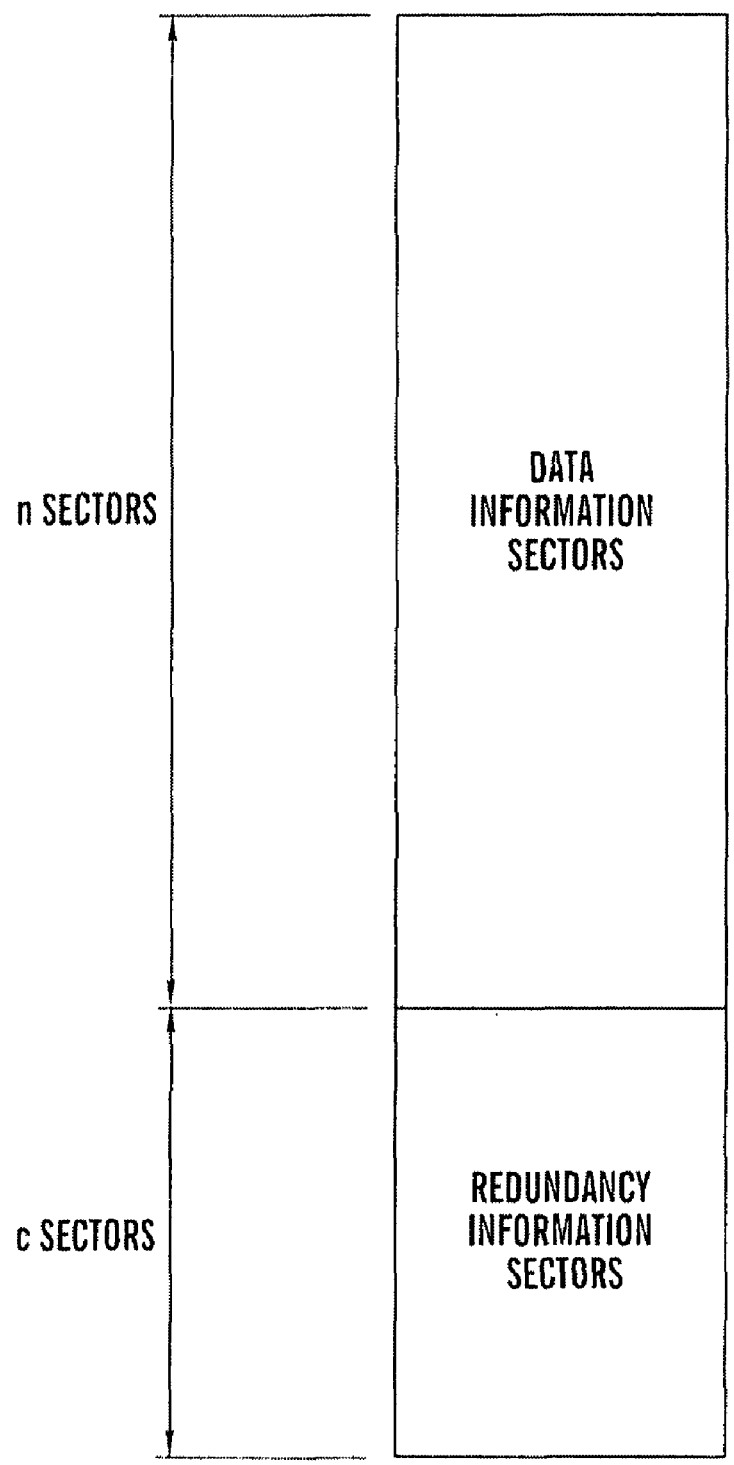
FIG. 1 illustrates one example of an exemplary format arrangement of n data sectors and c code sectors in accordance with exemplary embodiments of the present invention.

In particular, within implementations of the SPIDRE technique a segment of n data sectors is associated with a set of c code (referred to as correction code or SPIDRE code) sectors. An exemplary format arrangement of n data sectors and c code sectors according to exemplary embodiments of the present invention is shown in FIG. 1. Within exemplary embodiments, the n data sectors and the c redundancy sectors are written together on a single storage unit, A further exemplary storage information configuration comprises situating the c redundancy sectors within the middle of the n data sectors. As implemented within the exemplary embodiments of the present: invention, the c sectors are utilized to protect against uncorrectable media errors up to c sectors within the given data segment.

Further, there is no requirement that the n data sectors and the c redundancy sectors be separately stored. However, by storing the n data sectors and the c redundancy sectors separately normal read operations are expedited in a simplified manner. The solution further provides for the optimized flexible tradeoff in storage efficiency, performance and reliability by allowing for the selection of values for n and c.

Different types of erasure codes can be used to implement SPIDRE codes. For example, a general code such as a Reed-Solomon erasure code can be selected as a SPIDRE code for protecting any combination of n and c. In the alternative, an XOR-based code can be used for large values of n. Variations of one-dimensional parity can be used as yet another alternative type of erasure code. For example, one sector from each group of eight sectors is XORed with corresponding sectors from other groups. This alternative approach is simple and protects against media errors of consecutive sectors up to a group size.

Exemplary embodiments of the present invention provide a disk scrubbing solution based upon the SPIDRE scheme wherein the solution eliminates the need for additional I/O requests from any additional disks that are comprised within a RAID. As presently implemented within the exemplary embodiments, disk scrubbing operations are performed in two phases. The first scrubbing phase is carried out independently on each disk of a disk array. In the event that an unrecoverable sector or a block of unrecoverable sectors are located then no additional I/O requests need to be issued. Additionally, the first scrubbing phase operation provides systemic power saving advantages since only the disk that is to be scrubbed needs to powered on while the rest of the disk of the array can remain in a powered-off state.

if the number of unrecoverable sectors in a SPIDRE block is less than or equal to the erasure correction capability of the SPIDRE coding scheme, then the reconstruction of the unrecoverable sectors can be performed using SPIDRE redundancy. However, if the unrecoverable sectors cannot be reconstructed at their original storage locations, then the block of sectors, or the entire SPIDRE segment containing the affected sectors, or the entire strip containing the affected SPIDRE segment can be rewritten to spare storage space on the disk. Conversely, if the number of unrecoverable sectors in a SPIDRE block is greater than the erasure correction capability of the SPIDRE coding scheme, then the location of the SPIDRE segment is delivered to a RAID controller. The RAID controller marks the SPIDRE segment for scrubbing during a second scrubbing phase operation. The second phase of disk scrubbing is meant to exploit the redundancy along the RAID dimension and therefore is carried out during idle operational periods of the disks within the entire array.

Within further exemplary embodiments of the present invention the first disk scrubbing phase can be combined with normal array operations. By implementing an "on-the-fly scrubbing" process, an entire SPIDRE segment is read instead of any data that has been requested (e.g., user read commands are extended to read all n and c sectors that exist upon a disk). Errors that are encountered in the additionally read data are flagged for scrubbing. Therefore, on-the-fly scrubbing may provide a preferable mode of operation.

A disk scrubbing operation can be initiated by a RAID controller when a particular disk is in an idle operational mode. Within the exemplary embodiments the RAID controller does not need to wait until all the disks in an array are idle. As such, the first disk scrubbing phase can be initiated when any one of the disks in the array is in an idle operational mode. During the scrubbing mode of operation for a particular disk, a number of SPIDRE segments are read. If a sector or a block of sectors is unrecoverable, then the sector or sectors need to be reconstructed. All of the redundancy information necessary to perform a reconstruction task is available to the RAID controller because the redundancy information was read as part of the SPIDRE segment. The affected SPIDRE segment, including the reconstructed sector or block of sectors, is then rewritten to a spare location on the disk and a corresponding logical-to-physical address translation table is appropriately modified as a result of the data rewriting operation.

The second disk scrubbing phase needs to wait until the entire array is in an idle operational mode. The advantage of the present approach is that the second phase only needs to scrub specific locations that are noted during the first phase. This particular aspect greatly reduces the time required to complete each round of disk scrubbing. In the instance that an on-the-fly scrubbing process is implemented as the first scrubbing phase, the RAID controller already has issued read requests that encompass entire SPIDRE segments. This aspect presents an opportunity to perform a scrubbing operation in addition to delivering data to a host. In the event that an unrecoverable sector or block of sectors is discovered, the SPIDRE redundancy is used to reconstruct the unrecoverable sector or block of sectors for delivery to the host. This is essentially the first part of the scrubbing process. Additionally, the RAID controller rewrites the constructed SPIDRE segment to a spare location on the disk and updates the corresponding logical-to-physical address translation table.

Figure 2:
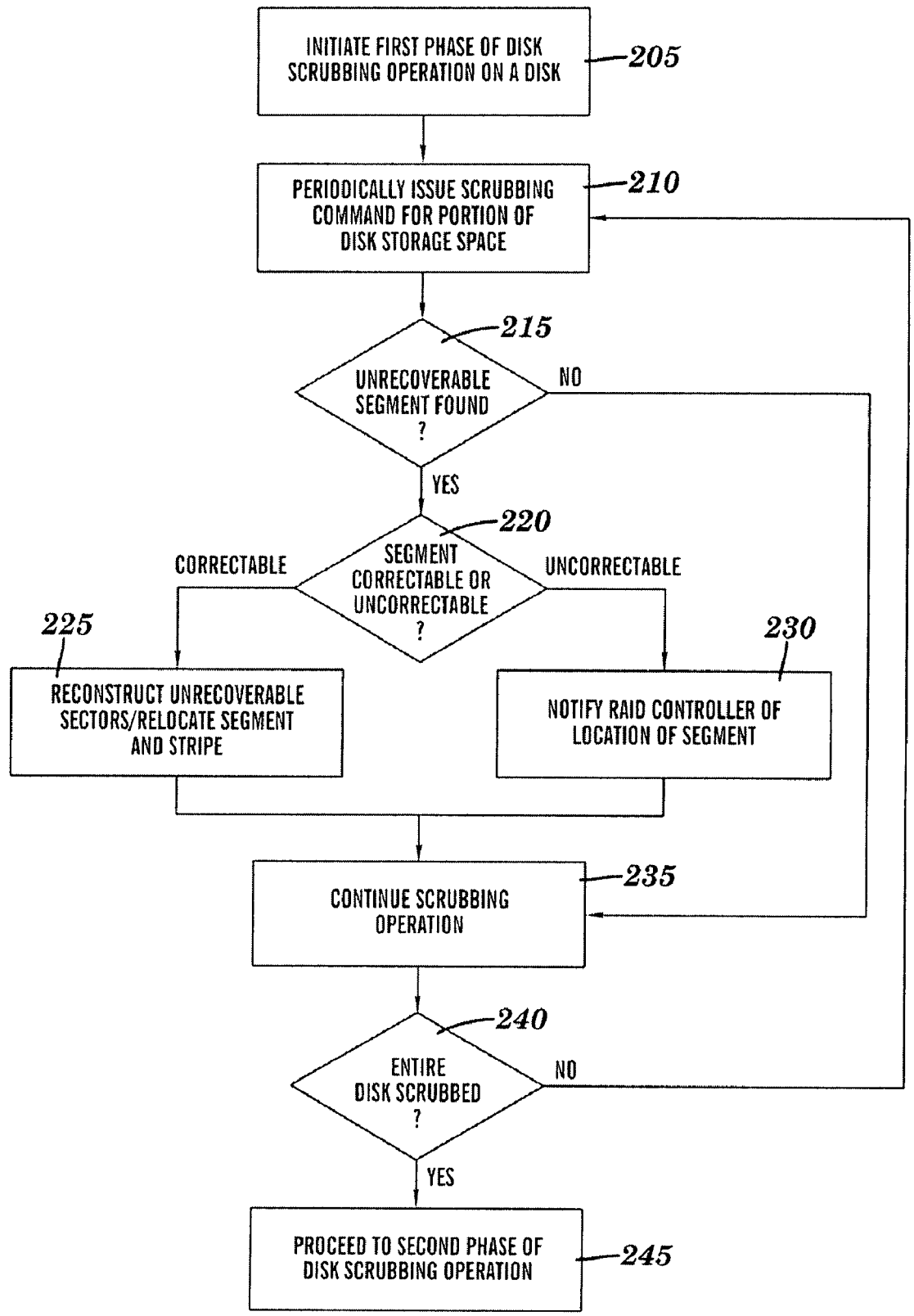
FIG. 2 illustrates flow diagram illustrating a method for the performance of a disk scrubbing operation in accordance with exemplary embodiments of the present invention.

FIG. 2 shows a flow diagram of an exemplary method for the use of an intra-disk redundancy storage protection operation (i.e., a SPIDRE operation) for the scrubbing of a disk. At step 205 a disk scrubbing operation initiated upon each disk of a plurality of disks that are comprised within a storage disk array, wherein the disk scrubbing command can be issued for a predetermined segment of the disks that are comprised within the storage disk array at a predetermined time internal (Step 210). At step 215, a determination is made to determine if at least one unrecoverable segment has been identified on a disk. In the event that an unrecoverable segment has been discovered, then at step 220 a determination is made to determine if any unrecoverable sectors discovered within the an unrecoverable segment can be reconstructed by the use of an intra-disk sector protection redundancy operation.

In the event that the discovered unrecoverable segment is correctable by the use of an intra-disk redundancy sector protection operation, then at step 225 the unrecoverable sectors of the unrecoverable segment are reconstructed. If the discovered unrecoverable segment is determined to be uncorrectable by the use of an intra-disk redundancy sector protection operation, then at step 230 a RAID controller is notified of the location of the unrecoverable segment. At step 235, the disk scrubbing operation is continued. And, at step 240, a determination is made to determine if the entire disk has been scrubbed. If the entire is disk has not been scrubbed, then the command is given to continue disk scrubbing operations at step 210. If the entire disk is determined to have been scrubbed, then at step 245, the scrubbing operation proceeds to the secondary scrubbing phase operation.

The capabilities of the present invention can be implemented in software, firmware, hardware or some combination thereof.

As one example, one or more aspects of the present invention can be included in an article of manufacture (e.g. one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for the use of an intra-disk redundancy storage protection operation for the scrubbing of a disk, the method comprising:
   initiating a disk scrubbing operation upon each disk of a plurality of disks that are comprised within a storage disk array;
   issuing a disk scrubbing command for a predetermined segment of the disks that are comprised within the storage disk array at a predetermined time interval;
   identifying unrecoverable segments on a disk;
   determining if unrecoverable sectors comprised within an unrecoverable segment can be reconstructed by the use of an intra-disk sector protection redundancy operation;
   reconstructing the unrecoverable sectors of the unrecoverable segment by the use of an intra-disk sector protection redundancy operation, where in the event that an unrecoverable sector cannot be reconstructed at an original storage location on a disk then the unrecoverable sector is reconstructed at a spare storage location on the disk;
   notifying a RAID controller of the location of the unrecoverable segment on the disk in the event that it is determined that the unrecoverable sectors comprised within the unrecoverable segment cannot be reconstructed by the use of an intra-disk redundancy sector protection operation; and
   determining if the entire disk has been scrubbed;
   wherein the unrecoverable sectors comprised within the at least one unrecoverable segment can be reconstructed using an intra-disk redundancy sector protection operation if the number of unrecoverable sectors within an intra-disk redundancy sector protection block is less than or equal to the erasure capability of an intra-disk redundancy protection coding scheme.

2. The method of claim 1, wherein the disk scrubbing operation is initiated by the RAID controller in the event that a disk is in an idle mode of operation.

3. A method for the use of an intra-disk redundancy storage protection operation for the scrubbing of a disk, the method comprising:
   initiating a disk scrubbing operation upon each disk of a plurality of disks that are comprised within a storage disk array;
   issuing a disk scrubbing command for a predetermined segment of the disks that are comprised within the storage disk array at a predetermined time interval;
   identifying unrecoverable segments on a disk;
   determining if unrecoverable sectors comprised within an unrecoverable segment can be reconstructed by the use of an intra-disk sector protection redundancy operation;
   reconstructing the unrecoverable sectors of the unrecoverable segment by the use of an intra-disk sector protection redundancy operation, where in the event that an unrecoverable sector cannot be reconstructed at an original storage location on a disk then the unrecoverable sector is reconstructed at a spare storage location on the disk;
   notifying a RAID controller of the location of the unrecoverable segment on the disk in the event that it is determined that the unrecoverable sectors comprised within the unrecoverable segment cannot be reconstructed by the use of an intra-disk redundancy sector protection operation; and
   wherein the unrecoverable sectors comprised within the at least one unrecoverable sector cannot be reconstructed using an intra-disk redundancy sector protection operation if the number of unrecoverable sectors within an intra-disk redundancy sector protection block is greater than the erasure capability of an intra-disk redundancy protection coding scheme.

4. A computer program product that includes a computer readable medium useable by a processor, the medium having stored thereon a sequence of instructions which, when executed by the processor, causes the processor to perform an intra-disk redundancy storage protection operation for the scrubbing of a disk by:
   initiating a disk scrubbing operation upon each disk of a plurality of disks that are comprised within a storage disk array;
   issuing a disk scrubbing command for a predetermined segment of the disks that are comprised within the storage disk array at a predetermined time interval;
   identifying unrecoverable segments on a disk;
   determining if unrecoverable sectors comprised within an unrecoverable segment can be reconstructed by the use of an intra-disk sector protection redundancy operation;
   reconstructing the unrecoverable sectors of the unrecoverable segment by the use of an intra-disk sector protection redundancy operation, where in the event that an unrecoverable sector cannot be reconstructed at an original storage location on a disk then the unrecoverable sector is reconstructed at a spare storage location on the disk;
   notifying a RAID controller of the location of the unrecoverable segment on the disk in the event that it is determined that the unrecoverable sectors comprised within the unrecoverable segment cannot be reconstructed by the use of an intra-disk redundancy sector protection operation; and
   determining if the entire disk has been scrubbed;
   wherein the unrecoverable sectors comprised within the at least one unrecoverable segment can be reconstructed using an intra-disk redundancy sector protection operation if the number of unrecoverable sectors within an intra-disk redundancy sector protection block is less than or equal to the erasure capability of an intra-disk redundancy protection coding scheme; and
   wherein the unrecoverable sectors comprised within the at least one unrecoverable sector cannot be reconstructed using an intra-disk redundancy sector protection operation if the number of unrecoverable sectors within an intra-disk redundancy sector protection block is greater than the erasure capability of an intra-disk redundancy protection coding scheme.

* * * * *